No. 649,889. Patented May 15, 1900.
F. W. COY.
PRESS AND MOLD FOR MAKING HEELS.
(Application filed Apr. 7, 1899. Renewed Mar. 21, 1900.)
(No Model.) 3 Sheets—Sheet 1.

WITNESSES:
A. D. Harrison
P. W. Pezzetti

INVENTOR:
F. W. Coy
by Wight Brown & Quinby
Attys

No. 649,889. Patented May 15, 1900.
F. W. COY.
PRESS AND MOLD FOR MAKING HEELS.
(Application filed Apr. 7, 1899. Renewed Mar. 21, 1900.)

(No Model.) 3 Sheets—Sheet 2.

WITNESSES:

INVENTOR:

No. 649,889. Patented May 15, 1900.
F. W. COY.
PRESS AND MOLD FOR MAKING HEELS.
(Application filed Apr. 7, 1899. Renewed Mar. 21, 1900.)
(No Model.) 3 Sheets—Sheet 3.
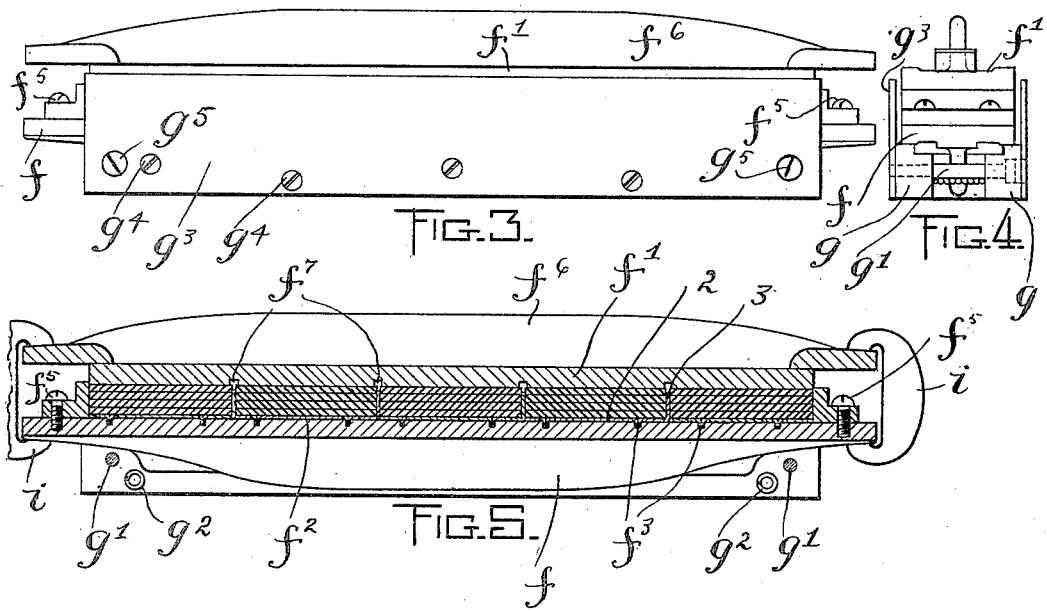
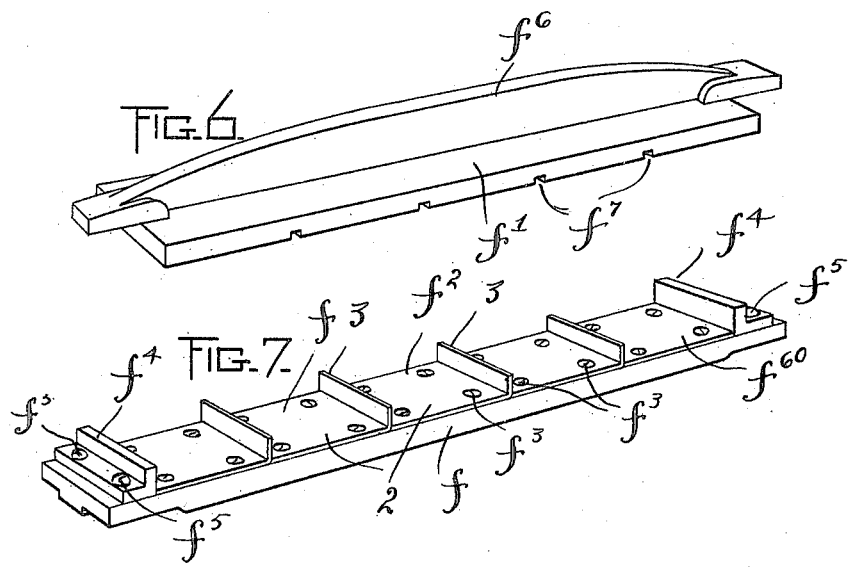
WITNESSES: INVENTOR:

UNITED STATES PATENT OFFICE.

FREDERICK W. COY, OF BOSTON, MASSACHUSETTS, ASSIGNOR, BY MESNE ASSIGNMENTS, TO THE AMERICAN HEEL MANUFACTURING COMPANY, OF PORTLAND, MAINE.

PRESS AND MOLD FOR MAKING HEELS.

SPECIFICATION forming part of Letters Patent No. 649,889, dated May 15, 1900.

Application filed April 7, 1899. Renewed March 21, 1900. Serial No. 9,608. (No model.)

*To all whom it may concern:*

Be it known that I, FREDERICK W. COY, of Boston, in the county of Suffolk and State of Massachusetts, have invented certain new and useful Improvements in Presses and Molds for Making Heels, of which the following is a specification.

This invention has relation to presses and molds for making heels or heel-blanks; and it has for its objects to improve the general operation of apparatus of this class, to give greater convenience in the manipulation of the mold and press, and to cheapen and improve the construction of the molds.

The invention consists in the improvements which I shall now proceed to describe and claim.

Figure 1:
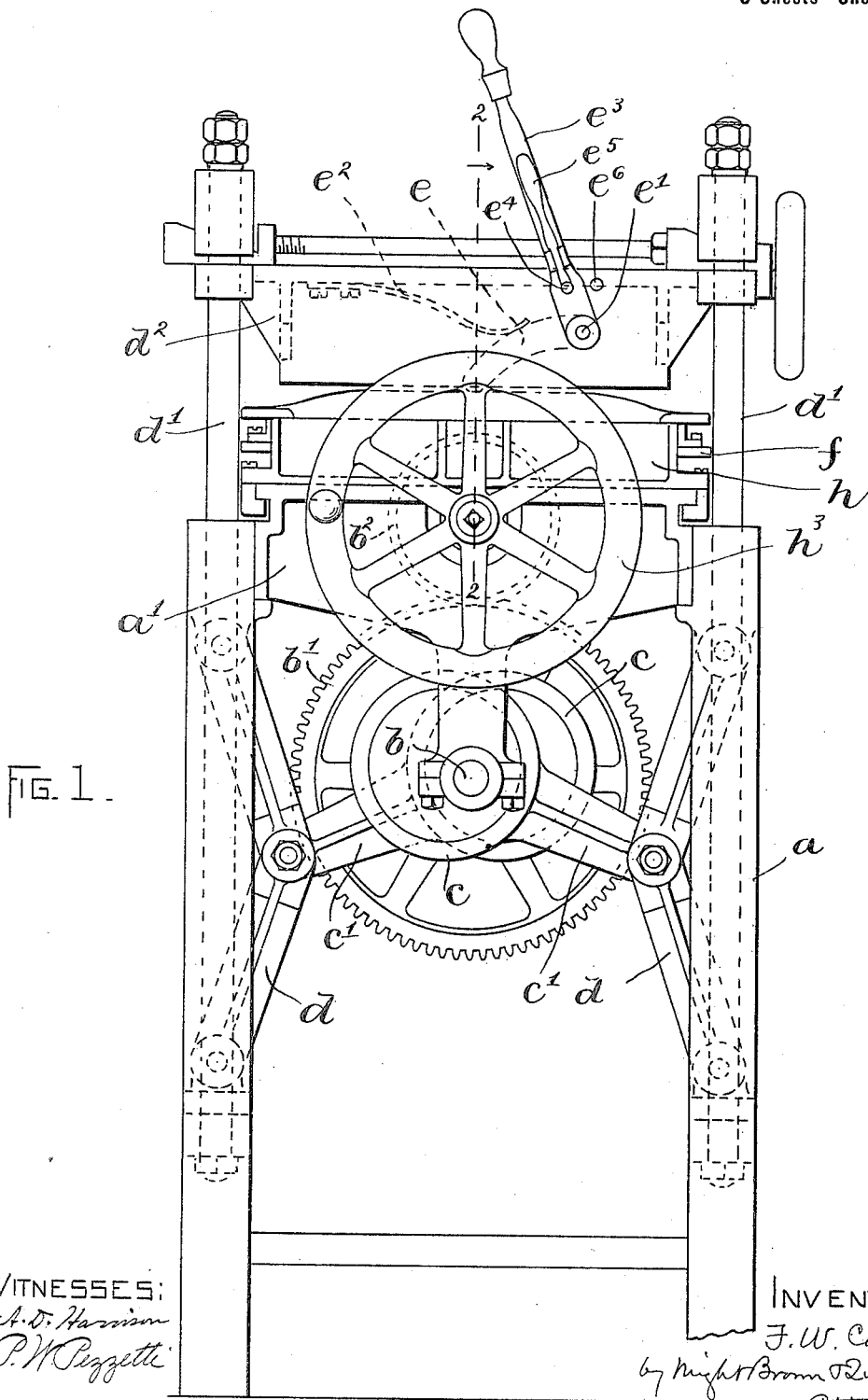
Figure 2:
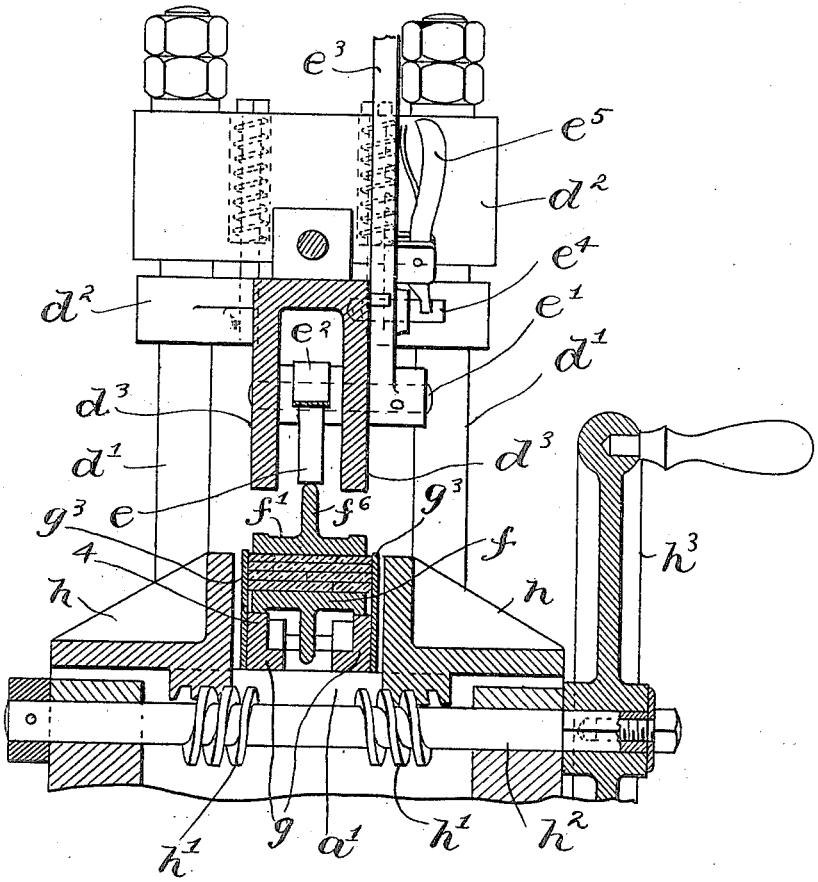

Of the accompanying drawings, forming a part of this specification, Figure 1 represents a front elevation of a heel-building press and mold constructed in accordance with my invention. Fig. 2 represents a transverse vertical section of the upper part of said machine on an enlarged scale. Fig. 3 represents a side elevation of the mold and its holder. Fig. 4 represents an end elevation thereof. Fig. 5 represents a longitudinal sectional view thereof. Figs. 6 and 7 represent perspective views of the members of the molds.

The same reference characters indicate the same parts in all the figures.

Referring to the drawings, $a$ designates the frame of the machine. $b$ designates a shaft mounted in bearings on said frame and adapted to be rotated intermittently through suitable gearing $b'$ $b^2$, which may be provided with a clutch or fast and loose belt-pulleys, as will be readily understood. $c$ $c$ designate eccentrics mounted on said shaft and having their straps prolonged into arms $c'$ $c'$, which are connected with toggles $d$ $d$. The latter are stepped at their lower ends in the machine-frame and connected at their upper ends with slide-rods $d'$ $d'$, carrying a cross-head $d^2$. Between said cross-head and a suitable portion $a'$ of the machine-frame forming a mold-bed is interposed the mold, which will be presently described, and in the cross-head on a stud $e'$ is pivoted an arm $e$, having its free end pressed downwardly by a spring $e^2$. The purpose of this arm is to abut against the cap-plate of the mold when side pressure is applied to the contents of the latter, as hereinafter described, so as to prevent buckling of said contents and the raising of the cap-plate. As the cross-head $d^2$ descends this arm $e$ yields against its spring $e^2$. The arm may be moved out of operative position by means of an operating-lever $e^3$, secured to the stud $e'$ and having a locking-pin $e^4$, operated by a spring-handle $e^5$ and adapted to enter a hole $e^6$ in the cross-head, whereby the arm $e$ is held out of operative position.

$f$ $f'$ represent, respectively, the bed-plate and cap-plate of the mold, in which the heels are assembled and subjected to pressure. The mold herein described is particularly adapted for the formation of heels or heel-blanks in which the intermediate lifts are each composed of two or more pieces of leather fitted together. The bed-plate, as shown in Figs. 5 and 6, is divided into separate sections or compartments, one compartment for each heel, and for the partitions between these compartments I provide a series of sheet-metal plates $f^2$ $f^2$, each having a portion 2, which lies flat against the bed-plate $f$, and a portion 3, turned up at right angles to said flat-lying portion and forming the partition between two adjacent sections of the mold. The plates $f^2$ are secured, by means of screws $f^3$ $f^3$, to the bed-plate $f$ and they may be of any desired length for the accommodation of different sizes of heels. The portion 2 of each plate forms the bed for the heel. The end partitions are formed by angle-blocks $f^4$ $f^4$, secured to the ends of the bed-plate $f$ by means of screws $f^5$ $f^5$. The cap-plate $f'$ is provided with transverse grooves or notches $f^7$ $f^7$, into which the upper edges of the partitions 3 3 enter when the mold is closed.

$g$ $g$ represent the two halves of a mold-holder, the same being connected by guide-pins $g'$ $g'$ and normally held apart by means of springs $g^2$ $g^2$. Each section of the holder is formed with a flat upper portion or surface 4, against which portions the edges of the bed-plate $f$ of the mold rest when said mold is in position, whereby the mold is supported, and to the outside of each section $g$ is secured, by means of screws $g^4$ $g^4$, a side plate $g^3$, which projects upwardly and covers the space between the bed and cap plates $f f'$ of the mold.

$h\ h$ represent pressing-jaws mounted to slide transversely on the machine-frame and provided on their under sides with worm-racks engaged by oppositely-directed worms $h'\ h'$ on a shaft $h^2$. At the end of the latter is secured a hand-wheel $h^3$, by means of which the shaft $h^2$ may be rotated and the jaws operated.

The machine operates as follows: The heel-lifts are first fitted together and assembled in the separate sections of the bed-plate $f$, and to each layer is applied a coating of paste or glue. The cap-plate $f'$ is then put in place and the mold placed in its holder. The arm $e$ presses against a web or ridge $f^6$ on the cap-plate and exerts action, as hereinbefore described, while the hand-wheel $h^3$ is being turned to bring the jaws $h\ h$ together. The latter abut against the outer plates $g^3$ on the mold-holder and move the members of said holder toward each other against the tension of the springs $g^2$, and the plates $g^3$ operate to compact the heel-blank laterally and cause the pieces of each lift to fit together closely. Power is then applied to rotate the shaft $b$ and cause the descent of the cross-head $d^2$, the arm $e$ yielding until two separated abutments $d^3\ d^3$, formed on the cross-head, come in contact with the opposite edges of the cap-plate $f'$ of the mold and press the latter down against the heel-blanks toward the mold bed-plate $f$. When the cross-head has reached its lower point, the ends of the mold are fitted with solid clamps $i\ i$ of the form represented in Fig. 5, the jaws of which embrace the bed and cap plates $f f'$ and serve to hold the two plates together, with the contents of the mold under pressure. The cross-head $d^2$ is then elevated, the jaws $h\ h$ retracted, and the mold and its clamps removed from the mold-holder and taken out of the press to allow the heels to "set." A fresh mold and heel-blanks may then be inserted and the operation repeated.

The plates $f^2$ in the mold supporting the partitions 3 may be placed loosely on the bed-plate without being screwed thereto, or said plates may be provided with holes to engage dowel-pins affixed to the bed-plate. The space between the partition 3 at one end of the series and the adjacent abutment $f^4$ may contain a filling-plate $f^{60}$, made in a separate piece, said plate corresponding in size with the plates $f^2$.

I claim—

1. A mold for forming heels, comprising cap and bed plates, and a series of partition-plates removably mounted on the bed-plate and having portions which lie flat against said bed-plate and constitute beds for the heels, and end portions bent at an angle to the aforesaid portions and constituting partitions which divide the mold into a number of separate compartments for the separate heels.

2. A mold for forming heel-blanks, comprising cap and bed plates, a series of partition-plates each having one end turned up and forming a partition between adjacent compartments of the mold and its remaining portion lying flat against the bed-plate, and means for securing the last said portions to the bed-plate.

3. An apparatus for forming heels, comprising a press having bed and presser, a mold interposed between said bed and presser, a holder for said mold, mounted on the bed and having provisions for supporting the mold, said holder being made in two parts and having side-pressing plates, springs normally pressing said parts away from each other, and jaws embracing the mold-holder and adapted to press the parts thereof toward each other.

4. An apparatus for forming heels, comprising a press, a mold, a holder for said mold, mounted in the press and having provisions for supporting the mold, said holder being made in two relatively-movable parts having portions adapted to exert side pressure on the contents of the mold, and jaws arranged outside of said side-pressing portions and adapted to move the same and the parts of the mold-holder toward each other.

5. An apparatus for forming heels, comprising a press, a mold removably supported therein and comprising separable cap and bed plate members, the bed-plate member having a series of partition-plates removably secured thereto, and means for rigidly clamping the members of the mold together so as to maintain pressure on the separate contents of the mold between the partition-plates when said mold is removed from the press.

In testimony whereof I have affixed my signature in presence of two witnesses.

FREDERICK W. COY.

Witnesses:
C. F. BROWN,
AMOS L. WOOD.